United States Patent
Lederer (10) Patent No.: US 9,154,632 B2
(45) Date of Patent: Oct. 6, 2015

(54) METHOD AND COMMUNICATIONS ARRANGEMENT FOR OPERATING A COMMUNICATIONS CONNECTION

(75) Inventor: Thomas Lederer, Herrsching (DE)

(73) Assignee: Unify GmbH & Co. KG, Munich (DE)

(*) Notice: Subject to any disclaimer, the term of this patent is extended or adjusted under 35 U.S.C. 154(b) by 890 days.

(21) Appl. No.: 12/678,565

(22) PCT Filed: Sep. 20, 2007

(86) PCT No.: PCT/EP2007/008210
§ 371 (c)(1),
(2), (4) Date: Mar. 17, 2010

(87) PCT Pub. No.: WO2009/039867
PCT Pub. Date: Apr. 2, 2009

(65) Prior Publication Data
US 2010/0211684 A1    Aug. 19, 2010

(51) Int. Cl.
*G06F 15/16* (2006.01)
*H04M 7/00* (2006.01)
*H04M 3/42* (2006.01)
*H04L 12/58* (2006.01)

(52) U.S. Cl.
CPC ........ *H04M 7/0012* (2013.01); *H04M 3/42042* (2013.01); *H04M 3/42323* (2013.01); *H04M 7/0027* (2013.01); *H04L 12/583* (2013.01); *H04L 51/063* (2013.01)

(58) Field of Classification Search
CPC ............ H04M 1/575; H04M 3/42042; H04M 3/42323; H04M 7/0012; H04M 7/0027; H04L 12/583; H04L 51/063

USPC ................................................ 709/227–228
See application file for complete search history.

(56) References Cited

U.S. PATENT DOCUMENTS

| | | | |
|---|---|---|---|
| 5,742,670 A * | 4/1998 | Bennett | 379/142.04 |
| 6,289,373 B1 | 9/2001 | Dezonno | |
| 6,463,148 B1 | 10/2002 | Brady | |
| 6,771,639 B1 * | 8/2004 | Holden | 370/352 |

(Continued)

OTHER PUBLICATIONS

International Preliminary Report on Patentability for PCT/EP2007/008210 (Forms PCT/IB/373, and PCT/ISA/237).

(Continued)

*Primary Examiner* — Philip Chea
*Assistant Examiner* — Wing Ma
(74) *Attorney, Agent, or Firm* — Buchanan Ingersoll & Rooney PC (57) ABSTRACT

The invention relates to a method and a communications arrangement for operating a communications connection between a communications terminal device (KE1) associated with a first participant and at least one first terminal device (KE2) associated with a second participant. For a process running on a second terminal device (RE1) integrating with a first communications terminal device (KE1) to be operated by the first participant, said process being free of functions for controlling the communications connection, at least one piece of information that is reproducible on a terminal device is extracted from a process-produced output (P1) to the second terminal device (RE1). Further, upon initiation of the communications connection between the communications terminal device (KE1) and the first terminal device (KE2), the reproducible information is transmitted to at one of the least one terminal devices (KE2, RE2) associated with the second participant.

23 Claims, 2 Drawing Sheets

(56) References Cited

U.S. PATENT DOCUMENTS

| | | | |
|---|---|---|---|
| 6,804,334 B1* | 10/2004 | Beasley et al. | 379/88.17 |
| 6,977,993 B2* | 12/2005 | Starbuck et al. | 379/88.21 |
| 8,442,227 B1* | 5/2013 | Yoakum et al. | 380/249 |
| 8,750,490 B2* | 6/2014 | Murtagh et al. | 379/342 |
| 8,804,573 B2* | 8/2014 | Maes | 370/256 |
| 2001/0056466 A1* | 12/2001 | Thompson et al. | 709/204 |
| 2002/0012425 A1* | 1/2002 | Brisebois et al. | 379/142.01 |
| 2003/0112941 A1* | 6/2003 | Brown et al. | 379/196 |
| 2003/0215080 A1* | 11/2003 | Wengrovitz | 379/219 |
| 2005/0100157 A1* | 5/2005 | Gray et al. | 379/265.01 |
| 2005/0128961 A1 | 6/2005 | Miloslavsky et al. | |
| 2005/0141688 A1* | 6/2005 | Wengrovitz | 379/207.02 |
| 2005/0286687 A1* | 12/2005 | Sanmugasuntharam et al. | 379/88.19 |
| 2007/0036284 A1* | 2/2007 | Raghav et al. | 379/67.1 |
| 2007/0047726 A1* | 3/2007 | Jabbour et al. | 379/373.02 |
| 2007/0071187 A1* | 3/2007 | Apreutesei et al. | 379/93.01 |
| 2007/0136433 A1* | 6/2007 | Booton et al. | 709/213 |
| 2007/0167168 A1* | 7/2007 | Fukamachi et al. | 455/456.1 |
| 2007/0168434 A1* | 7/2007 | Accapadi et al. | 709/206 |
| 2007/0263830 A1* | 11/2007 | Wengrovitz et al. | 379/219 |
| 2008/0115086 A1* | 5/2008 | Rupp et al. | 715/810 |
| 2008/0170678 A1* | 7/2008 | Davoust et al. | 379/201.01 |
| 2011/0286445 A1* | 11/2011 | Kamenetsky et al. | 370/352 |

OTHER PUBLICATIONS

International Preliminary Report on Patentability for PCT/EP2007/008210 (Forms PCT/IB/338, PCT/IB/373, and PCT/ISA/237) (English Translation).
International Search Report for PCT/EP2007/008210 dated Aug. 29, 2008 (Form PCT/ISA/210).
Written Opinion of the International Searching Authority for PCT/EP2007/008210 (Form PCT/ISA/237).

* cited by examiner

METHOD AND COMMUNICATIONS ARRANGEMENT FOR OPERATING A COMMUNICATIONS CONNECTION

CROSS-REFERENCE TO RELATED APPLICATIONS

This application is the United States national phase under 35 U.S.C. §371 of PCT International Application No. PCT/EP2007/008210, filed on Sep. 20, 2007. That application is incorporated by reference herein.

BACKGROUND OF THE INVENTION

1. Field of the Invention

Embodiments of the invention relate to methods and communications arrangements for operating a communications connection.

2. Background of the Art

During the everyday work life of office employees within a company, telephone connections, on the one hand, and email connections, on the other, are used today in equal measure for communicating with other participants, particularly within the same company. Frequently, there is a process in which an email communication has first occurred and, based upon this communication, possibly because some discussed items were not subsequently clarified, a telephone connection is initiated by one of the email participants to one of the other email participants. It is frequently ineffective for the calling participant to first have to explain the context of why he is calling to the called participant, i.e., that he frequently verbally repeats portions of the email so that the other participant recognizes which problem is being addressed. Under certain circumstances, this can lead to a time-consuming exchange of already known information or, under other circumstances, also to misunderstandings.

It would be helpful to perform telecommunications connections or other real-time communications connections more effectively.

BRIEF SUMMARY OF THE INVENTION

Embodiments of the invention relate to methods for operating a communications connection between a communications terminal device allocated to a first participant and at least one first terminal device allocated to a second participant. With these methods, for a process running on a second terminal device that interacts with a first communications terminal device that is to be operated by the first participant, said process being free of functions for controlling the communications connection, at least one piece of information that is reproducible on a terminal device is extracted by the output effected by the process on the second terminal device. This output can be a text, a graphics image, or multimedia, and the reproducible information corresponds to a coded representation of such an output which is to be processed by terminal devices or communications terminal devices. In a method according to the invention, upon initiation of the communications connection between the communications terminal device and the first terminal device, the reproducible information is transmitted to at least one of the at least one terminal devices allocated to the second participant.

Embodiments may be advantageous inasmuch as, by transmitting the reproducible information, information is conveyed to the second participant that explains the context that caused the first participant to initiate the communications connection. In a simple example, the first participant can, for example, can have opened an email on a desktop computer as the second terminal device and, based upon this email, can place a call to the sender of the email. In such a case, a text from the opened content of the email, for example, the subject line of the email, can be extracted and, upon initiation of the telephone connection to the second participant, i.e., to the sender of the original email, this text, together with a possible signaling of the communications connection to a terminal device of the second participant, is transmitted so that this text can be displayed to him on at least one of his allocated terminal devices.

If the display occurs already prior to the final relay of the connection and thus already before the call is accepted when the call in initiated together with an acoustical or optical signaling of the incoming call to the called terminal device, then the called participant can, at this early stage, already see what the thematic content of the following conversation will be. Consequently, following the relay of the communications connection, the first participant does not need to make a drawn-out verbal introduction in order to inform the second participant of the upcoming topic of the telephone conversation. Telephone conversations can thereby be conducted more effectively and rapidly.

DETAILED DESCRIPTION OF THE INVENTION

As already explained, in the case of the communications connection, one is dealing primarily with real-time connections, e.g., for telecommunications or for multimedia communications. For the communications terminal device allocated to the first participant, one is preferably dealing with a classic telephone terminal or a so-called soft client that provides telephone functions on a desktop computer. The same also applies to the first terminal device of the second participant. The second terminal device of the first participant is preferably a desktop computer of a company employee, which is either coupled with a telecommunications system, for example, by means of CTI coupling (CTI: Computer Telephony Integration), or, if the communications terminal device is a soft client, is the second terminal device of the desktop computer itself on which the soft client runs. The second terminal device, however, can also be any other type of computer device that can be coupled to a telephone network. For example, it is conceivable for the second terminal device to be a television with an innovative user interface that makes it possible for the content of the television screen or the textual information of the television signal, e.g., video text or an electronic program guide EPG, to be extracted and provided in transmittable form as reproducible information.

The reproducible information is preferably a representation of a text, multimedia content, or a graphics image, shown preferably in a document window of a user interface, which can be transmitted via a signaling connection to a second terminal device. For texts, this would be, for example, an ASCII code (ASCII: American Standard Code for Information Interchange), and for graphics, a code in JPG (Joint Photographic Experts Group), GIF (Graphics Interchange Format), or PNG format (PNG: Portable Network Graphics). Depending upon the size, all of the content can hereby, if necessary, be compressed, so that a transmission is possible without overloading the data or telephone lines.

In an advantageous embodiment of the invention, several terminal devices that have different functionalities can be allocated to the second participant. In such a case, it can be advantageous to select one of the terminal devices in such a way that the particular terminal device that is selected for the transmission and/or an output is specifically constructed or optimized for output of the reproducible information. For example, short textual information can be transmitted to a telephone with display so that the output occurs there. A graphics image, on the other hand, should preferably be transmitted only to a terminal device that has the capacity of outputting this graphics image. This is not the case for current conventional terminal devices that are used in company telephone systems, therefore, in this case, a transmission to a desktop computer appears to make sense. It is assumed, however, that graphics-capable telephone devices will also be increasingly used in future company networks, so that, in such cases, a graphics image can also be transmitted to a telephone device.

The transmission of the reproducible information can occur, on the one hand, via a telecommunications network or, on the other hand, via a data network. With a data network, one can be dealing, for example, with a TCP/IP-based LAN (TCP/IP: Transmission Control Protocol/Internet Protocol; LAN: Local Area Network), to which the desktop computers of the company employees are usually connected. Furthermore, in current implementations, telephones are also frequently connected to such data networks.

Preferably, when a transmission is made via a telecommunications network or via a telephony protocol, the communications connection can be made via a signaling connection between the first communications terminal device and the first terminal device of the second participant. In such a case, the transmission of the reproducible information occurs within the context of the signaling connection, for example, in the D-channel (D: data) of an ISDN connection (ISDN: Integrated Services Digital Network) or in corresponding signaling packages according to H.323 or SIP (Session Initiation Protocol), which are defined by the ITU-T (International Telecommunication Union, Telecommunication Standardizing Sector) or have been defined by the IETF (Internet Engineering Task Force). Depending upon the size of the reproducible information, one can access existing protocol elements for the transmission, or new protocol elements that are to be introduced can be used. Preferably one can hereby be dealing with optional protocol elements, so that compatibility to terminal devices that do not have such an output function is a given.

With the process according to the invention, which creates the output on the second terminal device, in the case of a desktop computer, one can be dealing with any kind of application that produces an output on a screen. This means in particular an application that was not originally developed for a communication via a telephone or multimedia connection. The application can, for example, be any type of office application, for example, a word processing task, a spreadsheet, an email program, a graphics program, or any other type of other application that produces a graphics, textual, or multimedia output. Preferably, however, the reproducible information is not permanently programmed lettering in the application, frequently called labels, but rather information that has been manually produced in some way by a user when operating the program. This information is understood to include, for example, in the case of an email, the subject line or the content of an email. In the case of a text file, this is understood to include, for example, the content of a text file or the file name of the data file. This information does not necessarily need to be editable or specified by the first participant, but rather, preferably, it is a content that was edited by some person in a workgroup, for example, even by the second participant, wherein the concerned data can possibly have reached the first participant via transmission by means of a data connection or email.

With an email application, for example, the subject line can be extracted from a display window of an email and transmitted as reproducible information to the first terminal device of the second participant. It is thus possible for the second participant to already receive the displayed content of the subject line when a communications connection is initiated, so that this person already knows the topic of the incoming call before accepting the call.

Since commonly used desktop computers are configured in such a way that several processes can run more or less simultaneously and that several applications can occupy portions of the screen, and also that individual applications, even though they have a graphics output, can be iconified and thus, though active, are not shown at a specific time on the screen, a method can be provided that determines which of the active applications is selected for the extraction of the reproducible information. For example, this process can run in a way that selects the application in which the input focus, e.g., displayed by a blinking prompt or by the display of a window in a different color, is currently located and/or is located in the foreground of all displayed windows.

Potentially, a determination can also be made regarding whether certain areas of a screen have been selected by a mouse pointer or by other means, so that this selected area, preferred for extracting the reproducible information, can be used. If, for example, an attachment of an email was selected or highlighted, then this attachment can be used as reproducible information for the transmission.

In order to determine from which window the reproducible information should now be extracted, that process can be ascertained that was active precisely when the call triggered the communications connection. The reproducible information is then extracted from this process.

Advantageously, in the case of a windows application on a desktop computer, the header of a window can also be extracted. This is especially advantageous for browser applications in which the header normally describes the displayed information in the browser window with short keywords. Alternatively, the content of a displayed document can also be recorded by structurally analyzing the document and subsequently extracting the reproducible information. With the example of a browser application, provision can thus be made to evaluate the definition of the HTML tag (HTML: Hyper Text Markup Language) H1 (which defines a title of the highest structural level) of a Web site, and to assess it as reproducible information. Analogously, this is possible for all document types that have a clear organizational structure and is a given for all word processing or XML-based (Extensible Markup Language) file types.

In an advantageous embodiment of the invention, the method according to the invention can be inventively coupled to a call-forwarding function. For example, provision can be made for one to already have the option of implementing call forwarding prior to accepting a call and possibly following the display of the reproducible information on the terminal device of the second participant. Thus, already based on the displayed reproducible information, the second participant has the option to decide whether or not another person should preferably take the call, so that, after taking the appropriate user action, he can forward the incoming call to this other employee.

Preferably, a rule-based system can hereby exist on the basis of which the second participant is offered a preferred forwarding location or a call is even forwarded automatically to another forwarding location. For this purpose, a set of rules can be defined that, based upon keywords or key information extracted from the reproducible information, are evaluated for call forwarding to additional pre-configured terminal devices. For example, the urgency of an incoming call can be recognized based upon keywords or reproducible information, so that, even if a participant is not at his desk telephone, an urgent call can be automatically forwarded to his cell phone. A configuration of appropriate rules can preferably be performed by the second participant himself or by centrally specified rules for all participants.

Preferably, in addition to call forwarding, other performance features can also be activated based upon rules. For example, when the system recognizes that the call is based upon, or is the result of, an email that was addressed to several participants, a teleconference can be arranged for all of these participants. Furthermore, the method according to the invention can also be implemented within the framework of the performance feature "call waiting", so that while the second participant is already engaged in an active conversation, when call waiting occurs, the content of the reproducible information is already displayed, so that the second participant receives an indication of whether or not it would be advisable for him to break off the existing connection and accept the incoming connection, i.e., in the wording of the claim, the communications connection, from the first participant.

In another embodiment of the method according to the invention, provision can be made for the reproducible information to be altered according to the output options of the first terminal device. This can, for example, be a so-called text-to-speech conversion or a newly developed graphics-to-text conversion, in which the essential content of the reproducible information is extracted and optimized for the appropriate output medium.

In another embodiment of the method, provision can be made for the reproducible information to be extracted only after starting the process of the first step to initiate the communications connection. Alternatively, provision can be made each time, already prior to the first action to initiate the communication, for an active window or for all running processes to be pre-determined and possibly for reproducible information to be pre-extracted and kept in readiness for establishing a communication. The latter alternative can then speed up the establishment of a communications connection.

The aforementioned embodiments also apply analogously to a communications arrangement according to further embodiments of the invention.

Figure 1:
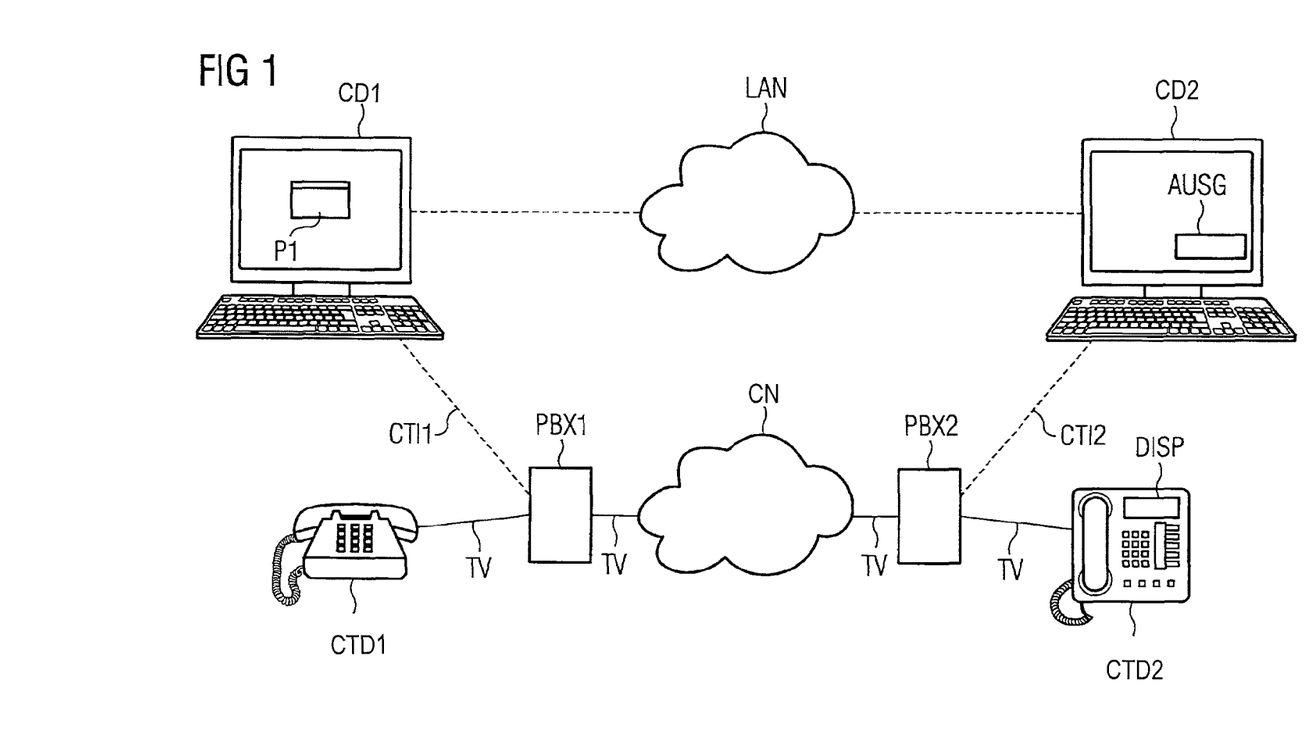
FIG. 1 shows a communications arrangement for implementing an embodiment of the invention.

FIG. 1 shows a schematic diagram of a communications arrangement for implementing a method according to an embodiment of the invention. The communications arrangement comprises a first communications terminal device CTD1 as the communications terminal device according to the invention, which is coupled to a first branch exchange PBX1 by means of a telephone circuitry TC. Furthermore, the first branch exchange PBX1 has a computer-telephone integration coupling CTI1 to a computer device CD1 as the second terminal device according to the invention. Via a communications network CN and the respective telephone circuitry TC, the first branch exchange PBX1 is also coupled with a second branch exchange PBX2, on which several communications terminal devices can be operated. As an example, one of these communications devices is shown with, the communications terminal device CTD2 as the first terminal device according to the invention. The coupling between the second communications terminal device KE2 CTD2 and the second branch exchange PBX2 via a telephone circuitry TC is, in turn, indicated by a dotted line. Furthermore, the second branch exchange PBX2 also has a coupling to a computer network or to various computers. By way of example, one is shown the second computer-telephone integration coupling CTI2 with which a coupling to the second computer device CD2 is made possible. In addition to the connection possibilities that were available up to now only for telephone connections, FIG. 1 uses dotted lines to indicate a circuitry between the two computer devices CD1 and CD2 via a local network LAN.

The resident programs or background processes possibly necessary for the computer-telephone integration couplings CTI1, CT2, which run on the respective computer devices CD1, CD2, are not explained in more detail below. Nevertheless, it should be clear to an expert that the computer devices CD1, CD2 must be prepared for the operation of connections into the LAN or to the branch exchanges PBX1, PBX2.

A process running on the first computer device CD1 is shown in FIG. 1 by its output window, the process window P1. Output options for the second communications terminal device CTD2 are shown on a display unit DISP that can, for example, be implemented by a customary LC-Display (LC: liquid crystal). Another output option using the second computer device CD2 is indicated by a display window shown on a user interface of the second computer device CD2.

It is assumed that the first communications terminal device CTD1, as well as the first computer device CD1, is operated by a company employee who is called a first participant. Analogous to this, the second communications terminal device CTD2 and the second computer device CD2 are operated by a second participant.

The starting point for the method described below is that the communications terminal devices CTD1 and CTD2 are both in idle mode and that the process window P1 is shown on the first computer device CD1. As an example, it is assumed that the process window P1 is an output of a received email, including the usual components of such a window, for example, an output for the recipient address, the sending address, the subject line, and the content of the actual message.

It is also assumed that, by reading the output shown in the process window P1, the first participant will know if he would like to leave the second participant a message or prefer to send him an inquiry. Using the first communications terminal device CTD1, the first participant will therefore subsequently attempt to place a call with the purpose of connecting to the second participant via the communications terminal device CTD2.

Triggered by the completion of the dialing process, or by the selection of the second participant's telephone number from a caller list, a call setup request for the first communications terminal devices CTD1 is signaled to the first branch exchange PBX1. The branch exchange PBX1 notifies the first computer device CD1 of this request via the computer-telephone integration coupling CTI1. Running on this computer device is an on-going process, not yet described in greater detail, that uses the incoming information to analyze which windows are currently active and which of the active windows has input focus on the first computer device CD1. In the present case, this is the process with the process window P1.

In the current example, the subject line of the e-mail is now read and transmitted to the first branch exchange PBX1 from this process window P1.

After receiving this information, the first branch exchange PBX1 now establishes a connection to the second branch exchange PBX2, or also to a second communications terminal device CTD2. This is a call-setup signaling connection with which the usual information required to set up a call is exchanged, and the subject line determined on the computer device CD1 is also transmitted as reproducible information. Preferably, the transmission is hereby performed in an optional element of the signaling connection.

Based on the incoming signal, the branch exchange PBX2 now forwards the cal-setup request to the second communications terminal device CTD2. On this device, the incoming connection-setup request is subsequently signaled to the second participant by the customary ring tone and optical signals, e.g., blinking of a LED (light emitting diode) or display on a display unit DISP.

In addition to this, the transmitted reproducible information, i.e., the original subject line of the email, is shown on the display unit DISP. This occurs already during the setup or signaling phase of the communications connection, and thus before this user data connection is actually relayed.

Furthermore, the information to be sent out can also be transmitted to the second computer device CD2 by the second branch exchange PBX2 via the second computer-telephone installation-coupling CTI2, so that the subject line of the original email can likewise be displayed on this computer device via the display window OUTPUT. The second participant therefore has the advantage of at least being able to read the subject line of the original email on one of his two terminal devices CTD2 and CD2 before he actually accepts the telephone call. He is thus already able to determine the actual context of the ensuing telephone call, so that there is no need for the participants to have a lengthy verbal conversation regarding what the following discussion taking place on the communications terminal devices CTD1 and CTD2 is about.

The output to the display unit DISP or the display window OUTPUT can hereby be adjusted individually for the respective displaying terminal device, in this case CTD2 and/or CD2. For example, for a display unit DISP of the communications terminal device CTD2, the number of displayable text passages is generally clearly limited, possibly making it necessary for the transmitted information to be shortened. This shortening can, for example, be performed in the second branch exchange PBX2, since this device possibly knows the output capacities of the configured communications terminal devices. On the other hand, a display window OUTPUT on the computer device CD2 normally has an additional spectrum of output options. For example, an output can consist of several lines or even be enhanced with multimedia or graphics content.

Alternatively to the shown embodiment, the call-setup signaling can also be performed using well-known transmission methods via the telephone circuitry TC and the branch exchanges PBX1, PBX2, although the transmission of the reproducible information takes place via a data connection that is to be established parallel to it via a local network LAN. In such a case, a protocol can be of proprietary nature or an existing protocol can be appropriately expanded for exchanging information between two computer devices CD1 and CD2. When the reproducible information is received, it can be sent out to the second computer device CD2 or, via the computer-telephone integration coupling CTI1, to the second communications terminal device CTD2.

Transmission via a data connection is therefore particularly advantageous in that, within the context of data transmissions, for every type of media to be transmitted, the specific protocols or protocol elements already exist and can be used within the context of the method according to the invention.

In FIG. 2 various views of a process window are shown. Using these views, the following discussion should describe which kind of information can be transmitted, for example, to the second communications terminal device CTD2. In the first example according to FIG. 2A, an output window W1 is shown in which any type of content is shown. Furthermore, the output window W1 has a header, as is customary for normal user interface window applications of a computer device. The header hereby comprises a textual content, which is indicated in the figure only by "XXXX". In the figure, this character string is called the text field T1.

Figure 2A:
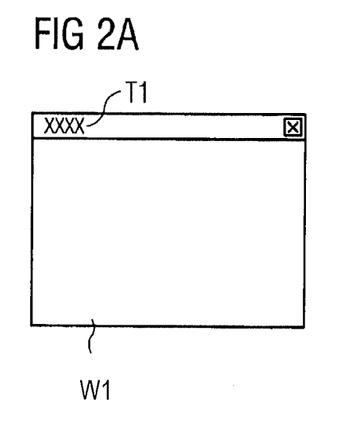
FIG. 2 shows various constructions for an output of a process according to an embodiment of the invention.

The header or the content of the text field T1 can preferably be evaluated for transmission, since a header normally concisely summarizes the content that is shown in output window W1. It is also advantageous that a header is able to show only a limited number of characters and that this number of characters is possibly similar in magnitude to the display capacity in a display unit of a telephone-communications terminal device. Consequently, there is preferably no need to convert or further shorten the information to be transmitted, although, if necessary, this can be done.

Figure 2B:
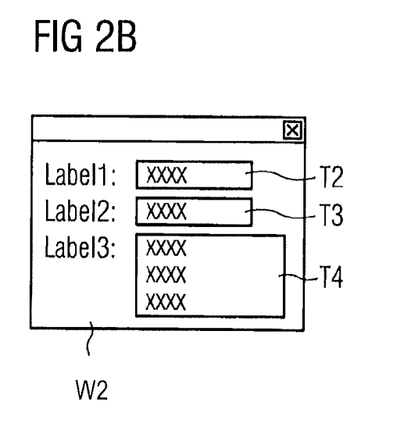

FIG. 2B shows a conventional computer device user interface F2 in which various labels and various text fields that are provided for an output are shown. In the figure, the labels are marked "Label1", "Label2", and "Label3". The text fields are called T2, T3, and T4, wherein the content of the text fields is indicated merely by "XXXX", as in the previous example. For example, Label1 could indicate that text field T2 contains an email address of a sender's email. Label2 can hereby indicate the content of text field T3, which, in this field, for example, shows the subject matter of an email. In the text field T4, for example, the body of an email is shown. For the method according to the invention, in such a case it is assumed that a subject line specified in the text field T3 is especially relevant for helping the participant receiving the call to quickly and easily understand and grasp the context of the following communications connection. The content of the text field T3 could therefore be transmitted as reproducible information. Alternatively, however, from the text field T4, some content could also be extracted that describes the topic of the displayed email and could therefore preferably be transmitted as reproducible information. An extraction from a longer text field can thus be performed based on expert system-related and rule-based analyses.

Alternatively, an extraction can also be made based on a user-selection of a section in a text field. This is shown schematically in FIG. 2C. A selection is hereby shown in customary user interfaces by inverting the script and the background color or by using a dotted frame. A selection can be made by keyboard entries, for example, by pressing the shift key, and by moving the cursor, or by mouse actions, for example, by pressing and holding down one of the mouse buttons and by moving the mouse pointer.

Figure 2C:
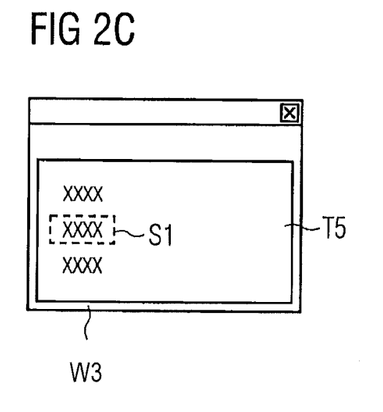

In FIG. 2C, a text field T5, which also contains several lines of text, is shown on a user interface F3. It is hereby assumed that a portion of the text field has been selected by the first participant. The selection is hereby shown within a dotted-line rectangle and called selection S1. This selection can now be transmitted as reproducible information to a second participant, either completely or after further editing.

Figure 2D:
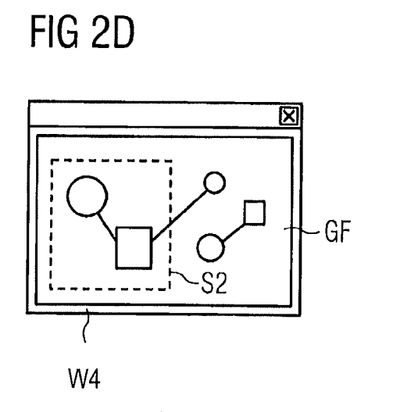

FIG. 2D now shows a corresponding process if purely textual content is not involved, but instead, either alternatively or additionally, graphics content. A graphics field GF that contains several vector-related or bitmap-related pieces of information is hereby shown in the process window F4. Also in this case, the complete view can be extracted and transmitted as reproducible information, or it can be evaluated as a selection S2, shown as a dotted-line rectangle, by which a portion of the image is selected. This selection S2 can now be extracted as reproducible information for a transmission. Prior to a transmission, however, the selected graphics can preferably be recoded, so that a representation of the graphics is achieved that is particularly well suited for transmission, particularly with respect to the bandwidth requirements.

Whereas the shown embodiments were previously optimized merely by a coupling between a desktop computer and a telephone terminal device, for the first participant, instead of a computer device CD1, any other type of terminal device can be coupled from which information can be extracted. For example, as the terminal device specified as the second terminal device according to the invention, one can use a television receiver that is equipped, for example, with a video text function. For the shown video text content, provision can be made to extract a portion of the video text content when a communications connection is initiated and to transmit it as reproducible information. This can, for example, be a type of title of the video text page or a new selection made by the user. Alternatively, in the case of a television, the television image can also be analyzed. For example, a still image can be generated and, from this, a portion of extracted graphics can then be transmitted as reproducible information. Furthermore, certain television programs are characterized by displaying the latest news in a type of scrolling ticker. Also here, it can be possible to extract the content of a scrolling ticker and transmit it graphically or, after conversion, textually as reproducible information to a second participant.

A coupling to another terminal device, such as, a washing machine or another household appliance, is also conceivable, for example, when a service technician is called, a type of error code for an occurring problem can already be determined as reproducible information.

Embodiments of the invention may also be characterized by the fact that, in certain situations, the communications connection does not need to be accepted or put through at all by the second participant, since the reproducible information is perhaps already sufficient to satisfy the first or second participant. This can be the case when, for example, the second participant has sent a clearly formulated question by email, and the first participant selects a text considered to be a response in such a way that this text is transmitted as reproducible information.

Analogous to this, if the second participant is unavailable, the transmitted reproducible information can be evaluated for a compiled contact list of missed calls in such a way that the reproducible information, along with the time of the call and the sender of the call, is displayed to the second participant in the contact list. Furthermore, the transmitted reproducible information can also be used for an answering machine in which, for each bit of stored spoken information, the reproducible information of the spoken message can be properly allocated and stored, so that the reproducible information can be sent out by means of menu-controlled access on a display or by a generated voice output, thereby making it possible to conveniently search stored spoken information without listening to the spoken information.

In an advantageous embodiment, provision can also be made for the transmission of the reproducible information to be deactivated per call or possibly also for an indefinite period of time, since transmitting the reproducible information to the second participant is perhaps not always the intent of the first participant.

In particular, it is advantageous to use the invention for so-called multi-line appearances, call groups, or so-called boss-secretary hook-ups. These so-called performance features are characterized by the fact that, when a call goes in to a first person, it is simultaneously communicated to at least a second person by a short ring tone, LED blinking, and/or a notification in a display, so that the second person can take the call. Normally, the call is accepted by both lifting the telephone receiver and pressing a button or selecting a menu item. The method is therefore particularly advantageous because the reproducible information can also be shown on the second person's terminal device. It is therefore simple for the second person to decide whether or not to accept the call.

The invention claimed is:

1. A method for operating a communications connection between a first communications terminal device and a second communications terminal device comprising:
the first communications terminal device sending a call setup request for establishing the communications connection with the second communications terminal device;
notifying a first computer device associated with the first communications terminal device of the call setup request for establishing the communications connection with the second communications terminal device, the call setup request being triggered by the first communications terminal device and being sent prior to the first computer device being notified of the call setup request;
the first computer device analyzing active applications in response to the notifying of the call setup request;
the first computer device determining an application of the active applications that is an input focus for the first computer device;
the first computer device determining reproducible information from the input focus;
attempting to establish the communications connection between the first communications terminal device and the second communications terminal device;
transmitting the reproducible information to at least one of the second communications terminal device and a second computer device associated with a user that is also associated with the second communications terminal device during the attempting to establish the communications connection between the first communications terminal device and the second communications terminal device; and
at least one of the second communications terminal device and the second computer device outputting the reproducible information prior to establishing the communications connection between the first communications terminal device and the second communications terminal device.

2. The method of claim 1 further comprising:
the first communications terminal device sending the call setup request to a public branch exchange;
the public branch exchange performing the notifying of the first computer device of the call setup request;
the first computer device transmitting the reproducible information to the public branch exchange;
the public branch exchange performing the attempting to establish the communications connection between the first communications terminal device and the second communications terminal device; and the public branch exchange performing the transmitting of the reproducible information to the second communications terminal device during the establishing of the communications connection between the first communications terminal device and the second communications terminal device.

3. The method of claim 2 wherein the public branch exchange is a first public branch exchange, the method further comprising:
   the first public branch exchange forwarding the call setup request to a second public branch exchange for establishing the communications connection;
   the first public branch exchange forwarding the reproducible information to at least one of the second public branch exchange and the second computer device to transmit the reproducible information to the second communications terminal device;
   the second public branch exchange forwarding the call setup request to the second communications terminal device; and
   the second public branch exchange transmitting the reproducible information to the second computer device associated with the second communications terminal device.

4. The method of claim 1 wherein the transmitting of the reproducible information to the second communications terminal device is performed within a context of signaling for establishing the communications connection between the first communications terminal device and the second communications terminal device, wherein the context of signaling corresponds to a D-channel of an Integrated Services Digital Network, signaling packages according to H.323 format, or signaling packages according to Session Initiation Protocol ("SIP").

5. The method of claim 1 wherein the determining of the application of the active applications that is the input focus comprises selecting the application from the active applications such that the application was active when the first computer device was notified of the call request and such that an active window associated with the selected application is displayed via the first computer device when the first computer device is notified of the call request, and the method further comprises:
   capturing the reproducible information from the selected application; and
   selecting the second communications terminal device from a plurality of devices such that the reproducible information is outputtable by the selected second communications terminal device according to a format of the captured reproducible information.

6. The method of claim 1 wherein the application that is the input focus is an application for communicating with emails, and wherein the reproducible information that is output at the second communications terminal device is content of an email or content of an email attachment.

7. The method of claim 1 further comprising withdrawing the attempt to establish the communications connection between the first communications terminal device and the second communications terminal device following the second communications terminal device outputting the reproducible information.

8. The method of claim 1 further comprising the second communications terminal device refusing a call associated with the call setup request.

9. The method of claim 1 wherein the reproducible information is at least one of a character string, an electronic graphics image, and a video and wherein the reproducible information is received by the second communications terminal device and wherein the reproducible information is displayed by the second communications terminal device prior to the communications connection being established and wherein the communications connection is a telephone call.

10. The method of claim 1 wherein the first communications terminal device is coupled to a household appliance and the reproducible information is a type of error code generated by the household appliance.

11. The method of claim 1 further comprising redirecting the communications connection from the second communications terminal device to another communications terminal device based on the transmitted reproducible information.

12. The method of claim 1 further comprising:
   providing a rule-based system in which at least one rule is defined for a piece of comparative information; and
   allocating an action applicable to the communications connection to the at least one rule;
   comparing content of the transmitted reproducible information with the comparative information of the at least one rule; and
   upon a determination that the comparative information matches at least a portion of the transmitted information, performing the action allocated to the at least one rule for the communications connection.

13. The method of claim 1 further comprising altering the reproducible information according to an output option of the second communications terminal device.

14. The method of claim 1 wherein the second communications terminal device outputting the reproducible information by displaying the reproducible information on a display device of the second communications terminal device prior to the communications connection being established.

15. A communications system comprising:
   a first communications terminal device for operating a communications connection between the first communications terminal device and at least one second communications terminal device;
   a computer device;
   the first communications terminal device sending a call setup request for the at least one second communications terminal device to establish the communications connection with the at least one second communications terminal device;
   the first communications terminal device triggering a notification of a call setup request directed to the at least one second communications terminal device, the notification to be provided to the computer device;
   the computer device receiving the notification of the call setup request after the first communications terminal device sends the call setup request;
   the computer device analyzing active applications and determining an application of the active applications that is an input focus for the computer device in response to the notification of the call setup request;
   the computer device determining reproducible information from the input focus;
   the first communications terminal device attempting to establish the communications connection between the first communications terminal device and the at least one second communications terminal device;
   the at least one second communications terminal device receiving the reproducible information during the attempt to establish the communications connection between the first communications terminal device and the at least one second communications terminal device; and the at least one second communications terminal device outputting the reproducible information prior to establishing the communications connection between the first communications terminal device and the at least one second communications terminal device.

16. The communications system of claim 15 further comprising a first public branch exchange and a second public branch exchange; and wherein the first communications terminal device sends the call setup request to the first public branch exchange;

wherein the first public branch exchange provides the notification to the computer device of the call setup request;

wherein the computer device transmits the reproducible information to the first public branch exchange; and wherein the first public branch exchange transmits the reproducible information to the at least one second communications terminal device during the attempt to establish the communications connection between the first communications terminal device and the at least one second communications terminal device.

17. The communications system of claim 16 wherein the computer device is a first computer device and the at least one second communications terminal device is comprised of a second computer device and a telephone associated with a user that is also associated with the second computer device, and wherein the second public branch exchange transmits the reproducible information to the second computer device and wherein the call setup request is directed to the telephone and the reproducible information is received by both the telephone and the second computer device.

18. The communications system of claim 15 wherein upon a determination that the communications connection is not completed at the at least one second communications terminal device, the reproducible information is evaluated and placed in a contact list of missed calls such that the reproducible information is displayed in the contact list of missed calls for the at least one second communications terminal device.

19. The communications system of claim 15 further comprising a third communications terminal device, wherein the third communications terminal device receives the reproducible information during the attempt to establish the communications connection between the first communications terminal device and the at least one second communications terminal device, and wherein the third communications terminal device outputting the reproducible information prior to establishing the communications connection between the first communications terminal device and the at least one second communications terminal device.

20. The communications system of claim 15 wherein the reproducible information is in a format selected from the group consisting of a character string, an electronic graphics image, and a video.

21. The method of claim 1 wherein the communications connection is a telephone call.

22. The method of claim 2 wherein the first computer device has a Computer Telephony Integration ("CTI") connection with the public branch exchange and the public branch exchange performs the notifying of the first computer device of the call setup request via the CTI connection and the first computer device transmits the reproducible information to the public branch exchange via the CTI connection.

23. The system of claim 16 wherein the computer device has a Computer Telephony Integration ("CTI") connection with the first public branch exchange and the first public branch exchange performs the notifying of the computer device of the call setup request via the CTI connection and the computer device transmits the reproducible information to the first public branch exchange via the CTI connection.

* * * * *